(12) United States Patent
Dukler et al.

(10) Patent No.: US 6,819,244 B2
(45) Date of Patent: Nov. 16, 2004

(54) CHIPLESS RF TAGS

(75) Inventors: Shlomo Dukler, Tel Aviv (IL); Yaron Meerfeld, Ramat Gan (IL)

(73) Assignee: Inksure RF, Inc., Tenafly, NJ (US)

(*) Notice: Subject to any disclaimer, the term of this patent is extended or adjusted under 35 U.S.C. 154(b) by 163 days.

(21) Appl. No.: 10/104,034

(22) Filed: Mar. 25, 2002

(65) Prior Publication Data

US 2002/0140557 A1 Oct. 3, 2002

Related U.S. Application Data

(60) Provisional application No. 60/279,120, filed on Mar. 28, 2001, and provisional application No. 60/317,953, filed on Sep. 10, 2001.

(51) Int. Cl.[7] .............................................. G08B 13/14
(52) U.S. Cl. ................................... 340/572.1; 313/483
(58) Field of Search ........................ 340/572.1; 313/483, 313/498, 506

(56) References Cited

U.S. PATENT DOCUMENTS

| | | |
|---|---|---|
| 5,005,873 A | 4/1991 | West |
| 5,467,082 A | 11/1995 | Sanderson |
| 5,568,417 A | 10/1996 | Furuki et al. |
| 5,736,596 A | 4/1998 | Heitz et al. |
| 5,909,176 A * | 6/1999 | Schrott et al. ........... 340/572.1 |
| 6,284,983 B1 * | 9/2001 | Lutschounig et al. ....... 313/494 |
| 6,624,569 B1 * | 9/2003 | Pennaz et al. .............. 313/505 |

FOREIGN PATENT DOCUMENTS

| | | |
|---|---|---|
| GB | 2232119 | 12/1990 |
| WO | 00/16286 | 3/2000 |
| WO | 01/16995 | 3/2001 |

OTHER PUBLICATIONS

Grinvald, A. et al., "Improved Fluorescent Probes for the Measurement of Rapid Changes in Membrane Potential," Biophysical Journal, Biophysical Society, vol. 39, Sep. 1982, pp. 301–308.

* cited by examiner

Primary Examiner—Thomas J Mullen, Jr.
(74) Attorney, Agent, or Firm—Oliff & Berridge, PLC

(57) ABSTRACT

A method of marking an article to enable its identification, by applying to the article a conductive path, which is at least partially coated with a dye layer of at least one compound selected from voltage sensitive fluorescent dye (VSFD), mixture of such dyes, electro luminescent (EL) compound, OLED compound or mixtures thereof, the dye layer being excitable to emit fluorescent radiation, which serves to identify the article.

27 Claims, 2 Drawing Sheets

CHIPLESS RF TAGS

This nonprovisional application claims the benefit of U.S. Provisional Application No. 60/279,120, filed Mar. 28, 2001 and U.S. Provisional Application No. 60/317,953, filed Sep. 10, 2001.

FIELD OF THE INVENTION

This invention relates generally to the field of radio-frequency (RF) identification technology. More specifically, We invention relates to chipless R tags.

BACKGROUND OF THE INVENTION

Nowadays, the term Radio Frequency Identification (RFID) covers small data-carrying devices that can be sensed at a distance by RIF receivers. The RID devices typically transmit RF radiation having a frequency of between 100 Hz to 10 GHz. Radio frequency identification tags and radio frequency identification tag systems are known, and find numerous uses. For example, radio frequency identification tags are frequently used for either personal identification in automated gates protecting secured buildings or areas, or for identification and/or security marking of articles such as bank-notes, cheques, credit cards, passports, packaging and tickets.

Today there are mainly two kinds of RF tags: tags that involve a microchip and are termed chip tags and newer, less known, chipless tags. Low cost REID refers to tags below one dollar each, where in chip tags the chip is the largest item of cost. By contrast, chipless tags have much lower prices, are thinner, more physically flexible than chip tags, they work over a wider temperature range and are less susceptible to electrical interference. However, despite all these advantages, the chipless tags known today usually have limited memory and no encryption, and the capability of such systems for identification of a each single item when the items are piled is inferior in comparison to chip tag Systems.

Examples of identification methods include the incorporation of holographic images in plastic credit/charge cards and "smart cards" which incorporate electronic circuitry on microchips. It is also known to mark articles with phosphorescent and/or fluorescent materials, which emit light of a particular wavelength, usually in the visible spectrum, when illuminated by excitation radiation. GB 2 232 119 describes a method for identification and/or security marking which involves the use of triboluminescent phosphors. Triboluminescent phosphors are materials that emit light as a result of mechanical action, for example frictional forces or pressure. Thus, the energy stimulation to produce the phosphorescent emission of light is provided in these compounds by mechanical force. The emission of this radiation serves to identify or confirm the authenticity of a test article and it is detected by a light detector.

Another class of light emitting materials are those involved in the construction of light emitting diodes. Organic light emitting diodes (OLED) refers to a type of display which uses organic material as a diode type light emitting material. OLEDs operate on the principle of converting electrical energy into light, a phenomenon known as electroluminescence. They exploit the properties of certain organic materials which emit light when an electric current passes through them. In its simplest form, an OLED consists of a layer of his luminescent material sandwiched between two electrodes. When an electric current is passed between the electrodes, through the organic layer, light is emitted with a color that depends on the particular material used. In order to observe the light emitted by an OLED, at least one of the electrodes must be transparent There are two categories of OLEDs; small molecule and polymer-based. When a current is passed through a cell, the polymers molecular structure is excited, creating light emission. The output efficiency of this process is within the spectrum from blue to infrared. Also, by blending polymers with different emission and charge-transport characteristics, OLEDs can be fabricated in which the emission colour varies as a function of the operating voltage.

Voltage sensitive dyes (VSD) have been used extensively for a decade by neurobiologists and cardiologists for following the propagation of nerve signals, employing imaging techniques. However, the use of these compounds has not been extended over the life science field.

Transmission and fluorescence signals of voltage-sensitive molecular probes have provided a powerful method for measuring changes in membrane potential (A. Grinvald et. al., Biophys. J. Biophysical Society, 39, 301–308, 1982). The VSD molecules bind to the external surface of excitable membrane indicated as molecular transducer that transforms changes in the membrane potential into optical changes. These optical signals are correlated with the membrane potential changes and are monitored with light imaging devices such as fast cameras or with a diode array camera.

SUMMARY OF THE INVENTION

According to one aspect of the present invention there is provided a method of marking an article to enable its identification, the method comprising: applying to the article a conductive path, which is at least partially coated with a layer comprising at least one compound selected from voltage sensitive fluorescent dye (VSF), mixture of such dyes, electro luminescent (EL) compound, OLED compound or mixtures thereof Such layer is hereinafter termed "dye layer" and compounds of the type of VSFD, EL and OLED are hereinafter referred to as "dyes". In addition, a compound termed in the present application "OLED compound", is a diode type light emitting organic material.

The article may be subjected to means for stimulating fluorescence from said dye layer and when subjected thereto, the fluorescent radiation from the dye layer is transferred into an electrical signal, which serves to ides or confirm the authenticity of the article.

In a preferred embodiment, a plurality of conductive paths is applied to the article, each conductive path being at least partially coated with a dye layer comprising at least one compound selected from a voltage sensitive fluorescent dye (VSFD), mixture of such dyes, electro luminescent (EL) compound, OLED compound or mixtures thereof, each of the dye layers being individually excitable to cause fluorescent radiation emitted from each of said VSFD layers, thereby producing a plurality of signals indicative of the fluorescent radiation emitted by the dye layers which serve to identify the article.

According to another aspect of the present invention there is provided a radio frequency (RF) tag comprising a substrate, a conductive path at least partially coated by a dye layer comprising at least one compound selected from a voltage sensitive fluorescent dye (VSFD), mixture of such dyes, electro luminescent (EL) compound, OLED compound or mixtures thereof, a photosensitive means, and a radio frequency antenna, wherein:

the dye layer is capable of emitting light in response to a voltage signal induced in the conductive path;

the photosensitive means is capable of receiving the emitted light and converting it to an electrical signal that depends on the intensity of the emitted light; and the RF antenna is electrically connected to the photosensitive means, so as to be responsive to the electrical signal, produced in the photosensitive means in response to the light emitted from the dye layer, to transfer the electrical signal into an RE signal.

According to a preferred embodiment of this aspect of the invention, the tag includes a plurality of interconnected conductive paths rather than a single one. Each of these conductive paths at least partially incorporates a dye layer, so that a voltage signal induced in any one of the conductive pats causes the dye layer involved in this path to emit light The plurality of light emissions emitted from the plurality of dye layers are transferred by the light sensitive means to a plurality of electrical signals, and these are transmitted by the antenna as a plurality of RF signals.

Preferably, the tag according to this embodiment is arranged to transmit the plurality of RE signals sequentially. This may be obtained, for instance, by fabricating the inter-path electrical connections from a material having a low electrical conductivity or by a delay line. The low conductivity of the inter-path connections or the delay line causes the voltage signal induced in one conductive path in tie sequence to reach the next conductive path in the sequence after a time delay, which is set to be long enough so that the light sensitive means will treat the emission from each of the dye layers as an independent signal.

A further aspect of the present invention is an article carrying a tag according to the invention. In particular, it may sometimes be desired that the substrate of the tag is the article itself One preferable method for fabricating a tag according to the invention comprises the following steps:

(i) providing a substrate;

(ii) printing on the substrate at least one conductive path;

(iii) printing at least partially on each of the said at least one conductive path a dye layer comprising a voltage sensitive fluorescent dye (VSFD), a mixture of such dyes, an EL or OLED compound or mixtures thereof, thus forming at least one printed conductive path at least partially coated;

thus forming at least one printed conductive path at least partially coated;

(iv) applying to said at least one printed conductive path formed in step (iii) photosensitive means that is capable of sensing light emitted from said dye layer coating said conductive path; and (v) printing an antenna electrically connected to the photosensitive means and to one of the conductive paths.

Preferably, the tag is finally coated with a protective lacquer.

The printing in any one of the steps (ii), (iii), and (v) may be carried out by any kind of known printing method, for example ink jet printing, offset printing impression printing, flexo printing, screen printing gravure printing, laser toner printing, thermal printing and thermal transfer printing. The inkjet printing method is considered favorable.

BRIEF DESCRIPTION OF THE DRAWINGS

In order to understand the invention and to see how it may be carried out in practice, a preferred embodiment will now be described, by way of non-Eliminating example only, with reference to the accompanying drawings, in which.

DETAILED DESCRIPTION OF THE INVENTION

Figure 1:
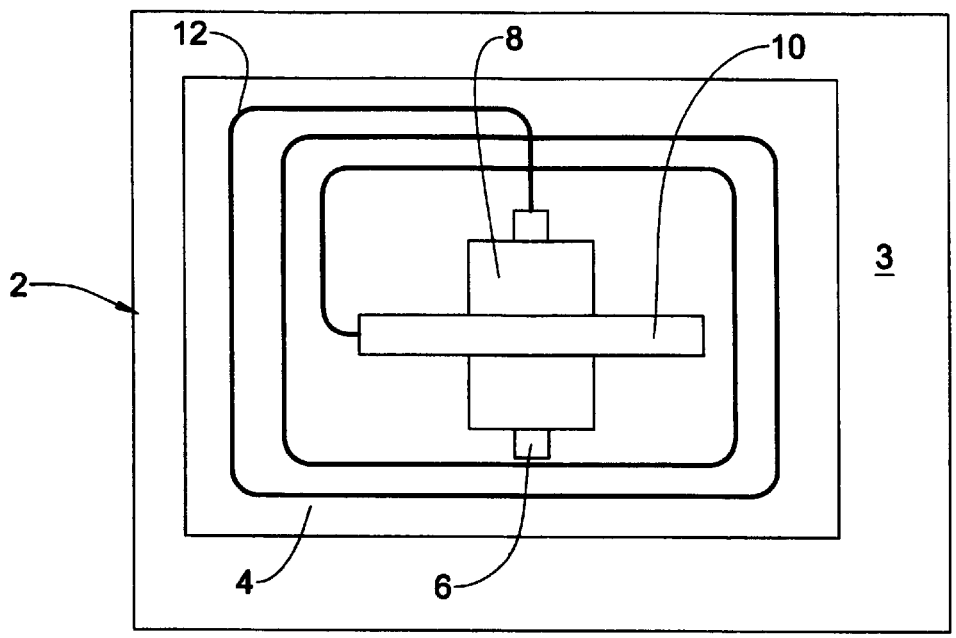
FIG. 1 is a schematic illustration of one embodiment of the present invention.

FIG. 1 illustrates an RF tag 2 according to the invention attached to an article 3. The tag 2 includes a substrate 4; a conductive path 6 at least partially coated by a dye layer 8, a photosensitive means 10, and an RF antenna 12, electrically connected at one end to the photosensitive means 10 and at the other end to the conductive path 6. It should be noted that in some cases, depending mainly on the specific dye used, it is preferable to coat the conductive path 6 with a mediating polymeric layer that will lie between it and the dye layer 8.

Materials that may be suitable as dyes are, for example cyanine dyes such as thiocyanines, indocyanines, quinoline or pyrido-cyanines, hemicyanines, merocyanine dyes, oxonol dyes, styryl dyes, and other structural types such as coumarines, xanthene dyes, benzals, triphenylmethanes, pyrylium derivatives, porphirins, OLED compounds, i.e. organic materials used in the fabrication of OLEDs, such as for example polythiophenes, e.g. poly(cyclohexylmethylthiophene), poly(cyclohexylthiophene), highly fluorescent conjugated polymers, e.g. poly(p-phenylenevinylene), poly[2-methoxy-5-(2-ethylhexyloxy)-p-phenylenevinylene], poly[2,2'-(p-phenylene)-6,6'-bis(3-phenylquinoxaline)].

For identification purposes it may be convenient to apply different dyes to different articles or to apply them in different patterns (for example as bar codes) on different articles. Using a combination of several dye compounds may create a coding system in which every character in a sequential code can be marked in both its absolute value and the relative position in the sequence.

Materials that may be suitable to form mediating layer between the conductive path 6 and the dye layer 8 are polymeric materials, for example phospholipids, e.g. phosphatidylcholine, bilayer lipid, giant lipid vesicle bound by a polyelectrolyte, or phospholipid liposomes.

Apart from the polymeric material specified above, in the preparation of the mediating layer there are involved additional ingredients, for example a binder such as acrylic resins, acrylic block copolymers, vinylic resins, , poly vinyl acetate, PMMA (poly methyl metacrylate), poly sulfone resin, polyvinyl alcohol 80%, cellulose acetate, cellulose triacetate, carboxy methyl acetate, modified gelatin or modified starch; an organic solvent, for example glycols, ketones, alcohols, esters, etc.; water and surfactants.

In operation, a voltage is applied in the conductive path 6 by inducing a signal in the antenna 12 connected thereto. Applying the voltage to the conductive path 6, causes the dye layer 8 to emit light. This light is sensed by the photosensitive 8, device 10, which is typically a photodiode, which generates an electrical signal indicative of the sensed light. The electrical signal is transmitted as an RF signal by the antenna 12.

When an article caries the tag, the RF radiation emitted by the antenna 12 may be "read" by a receiver of this radiation in order to identify the article. However, this, embodiment is quite limited in its identification capability, since it may identify one group of articles (those with a tag) from all the others, or a limited number of groups of articles, that differ in the signal the antenna transmits. The signal transmitted by the antenna depends on the intensity of the light emitted from the dye layer 8. This intensity depends on the concentration of the dye in the layer (and on the specific dye used). Thus, tags transmitting several different signals (corresponding to several different dyes and/or different concentrations of dyes), may be identified.

Figure 2:
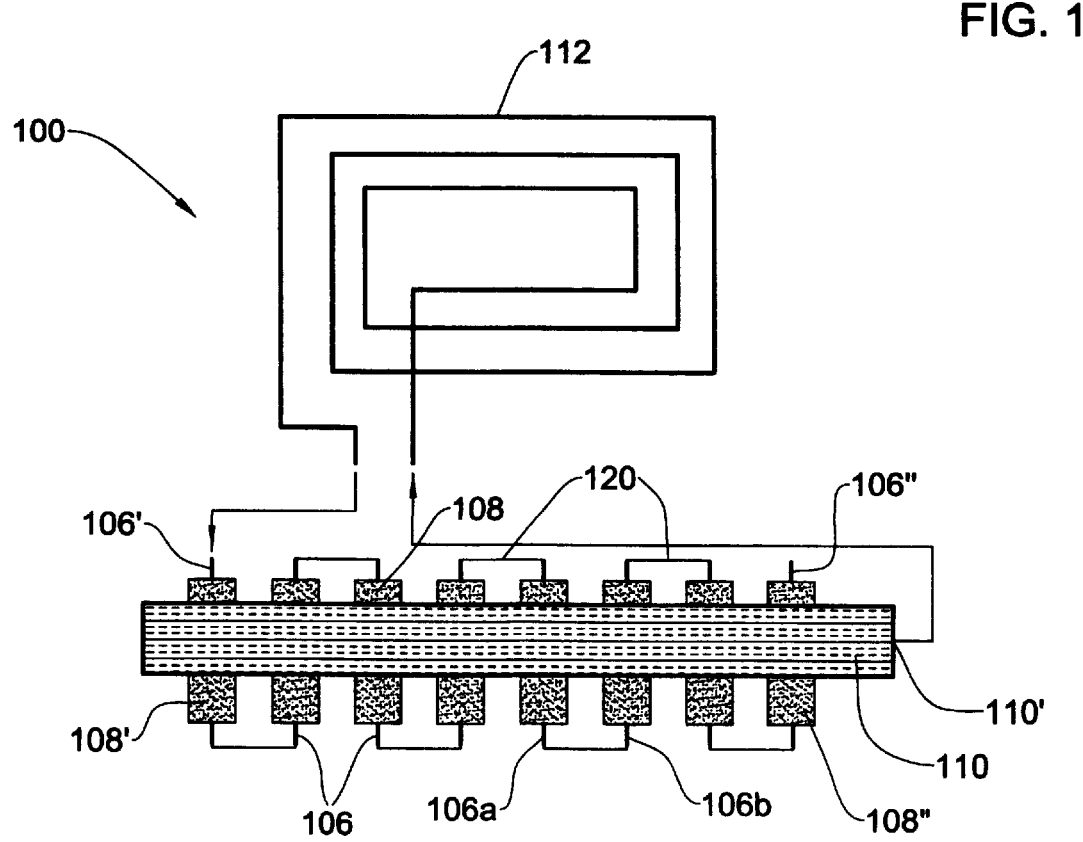
FIG. 2 is a schematic illustration of another embodiment of the present invention.

FIG. 2 is an illusion of another embodiment of We present invention. Here a tag 100 includes a plurality of conductive paths 106 rather than a single one. Each of the conductive paths 106 is at least partially coated with a dye layer 108, so that a voltage applied to any one of the conductive paths causes the dye layer coating this path to emit light. The plurality of light emissions from the plurality of layers 108 are transferred by the photodiode 110 to a plurality of electrical signals, and these are transmitted by the antenna 112 as a ply of RF signals. The tag 100 is arranged to transmit the plurality of RF signals sequentially. This is obtained by inter-path connections 120, connecting the conductive paths 106 in series. The low electrical conductivity of the paths 120 cause the voltage signal induced in one conductive path (say, 106a) to reach the net (locally adjacent) conductive path in the sequence (106b) after a time delay, which is long enough so that the photodiode 110 will treat the emission from each of the layers 108 as an independent signal. The connection of the antenna to the conductive path 106' on the one hand and to the photodiode 110 (at the point 110') on the other hand dictates that the signal corresponding to the VSFD layer 108' will be transmitted first and the signal corresponding to the VSFD layer 108" will be transmitted last. This way, an order is induced into the transmission of the signals by the tag. Such an order is essential to use the tag for identifying a large number of different articles. If each of the dye layers 108 is capable of emitting lift in N different intensities that the photodiode 110 may distinguish from each other, the tag 100 having 8 different dye layers will transmit $N^8$ different signals, thus enabling identification of $N^8$ different articles.

As mentioned above, one preferred method for fabricating a tag according to the invention comprising the following steps:

(i) providing a substrate;

(ii) printing on the substrate at least one conductive path;

(iii) printing at least partially on each of the said at least one conductive path at least a layer of dye comprising a compound selected from voltage sensitive fluorescent dye (VSFD), mixture of such dyes, electro luminescent CEL) compound, OLED compound or mixtures thereof, thus forming a printed conductive path at least partially coated;

(iv) applying to said printed conductive path formed in step (iii) photosensitive means that is capable of sensing light emitted from each of the at least one dye layer; and (v) printing an antenna electrically connected to the photosensitive means and to one of the conductive paths.

Preferably, the tag is finally coated with a protective lacquer.

The printing in any one of the steps (ii), (iii), and (v) may be carried out by any kind of known printing method, for example ink jet printing, offset printing, impression printing, flexo printing, screen printing, gravure printing, laser toner printing, thermal printing and thermal transfer printing. The inkjet printing method is considered favorable.

Every conductive ink known in the art per se may be used as ink in printing the conductive paths (6, 106) and the antennas (12, 110) in the printing steps (i) and (v).

As for printing the dye layer (step (iii)), the dye is applied together with a conventional lithographic ink or by any of the conventional printing inks system. A non-limiting example of a VSFD ink composition is formulated as follows: to a mixture of 60 gr deionized water were added 20 gr of VSFD material, 7.5 gr of a polymeric material, for example polyacrylamide, styrene maleic anhydride copolymer, polyacrylic acid or polyethylene glycol, 8 gr polyethylene oxide, 1 gr tris-hydroxyethyl-aminomethane, 0.7 gr ethylene diamine tetraacetic acid, 6 gr ammonium chloride, 0.2 gr biocide, 12 gr cyclopyrrolidinone, 20 gr acethylethanol amine, and 20 gr diethylene glycol. The mixture is blended for a period of time suitable for obtaining an ink composition which is further filtered through a 0.2 micron filter.

Figure 3:
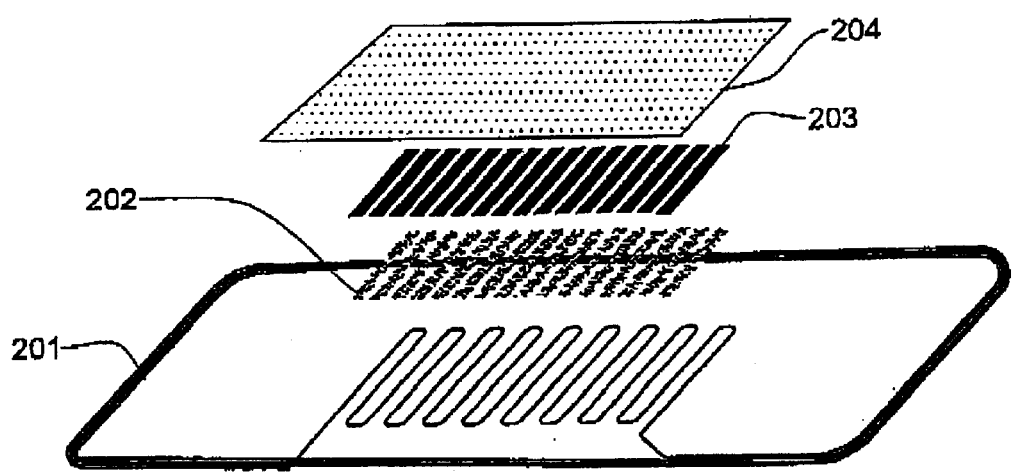
FIG. 3 is a schematic illustration of The layer construction of one embodiment of the present invention.

As mentioned above, in some cases it is preferable to use an intermediate polymeric layer between the conductive path and the dye layer. The layers construction of a tag in such a case is illustrated in FIG. 3, showing a layer of conductive paths (and antenna) 201, an intermediate polymeric layer 202, dye layers 203, and a photodiode 204.

In case of VSFD dyes, the materials of the mediating layer 202 should be capable of imitating the influence of a biological membrane on the light emission characteristics of the VSFD. Suitable materials are for example bilayer lipid, phospholipids, e.g. phosphatidylcholine, giant lipid vesicle bound by a polyelectrolite or phospholipid liposomes.

Apart from the polymeric material specified above, in the preparation of the mediating layer there are involved additional ingredients, for example, a binder such as acrylic resins, acrylic block copolymers, vinylic resins, poly vinyl acetate, PMMA (poly methylmetacrylate), polysulfone resin, polyvinyl alcohol 80%, cellulose acetate, cellulose triacetate, carboxy methyl acetate, modified gelatin or modified starch; an organic solvent for example glycols, ketones, alcohols, esters, etc.; and surfactants.

The RF tag of the invention may be used for identification and/or security marking in various applications and of many different articles such as stamps, garments, tickets, air baggage, banknotes, passports, financial cards, in parcel tracking, for proof of ownership, pallets, supermarket trolleys, ID cards or parts of machinery.

What is claimed is:

1. A method of marking an article to enable its identification, the method comprising:

applying to the article a plurality of conductive paths, each conductive path being at least partially coated with a dye layer comprising at least one compound selected from voltage sensitive fluorescent dye (VSFD) compound, electro luminescent (EL) compound, and organic light emitting diode (OLED) compound, each of the dye layers being excitable to cause fluorescent radiation to be emitted therefrom, thereby producing a plurality of signals indicative of said fluorescent radiation, said signals serve to identify the article.

2. A method according to claim 1 wherein said fluorescent radiation emitted by the dye layers is detected and transferred into an electrical signal.

3. A method according to claim 2 wherein said electrical signal is transferred into RF radiation by an antenna.

4. A method according to claim 1 wherein said conductive path is coated with a mediating polymeric layer prior to being coated at least partially by said dye layers.

5. A method according to claim 4 wherein said polymeric layer comprises a phospholipid, a bilayer lipid or phospholipid liposomes.

6. A method according to claim 3 wherein said fluorescent radiation emitted by said dye layers is detected and transferred into the electrical signal by a photodiode.

7. A method according to claim 1 wherein said each conductive path is applied to said article by a printing method.

8. A method according to claim 7 wherein said printing method is inkjet printing.

9. A method according to claim 1 wherein said conductive paths are applied to said article by a printing method.

10. A method according to claim 9 wherein said printing method is inkjet printing.

11. A method according to claim 1 wherein said dye layer further comprises a mixture of more than one compound, each being independently selected from voltage sensitive fluorescent dye (VSFD) compound, electro luminescent (EL) compound, and OLED compound.

12. A method according to claim 1, wherein said dye layers comprise a mixture of more than one compound, each being independently selected from voltage sensitive fluorescent dye (VSFD) compound, electro luminescent (EL) compound, and OLED compound.

13. A radio frequency (RF) tag comprising a substrate, a conductive path at least partially coated by a dye layer comprising at least one compound selected from a voltage sensitive fluorescent dye (VSFD), electro-luminescent (EL) compound, organic light emitting diode (OLED) compound, a photosensitive device, and a radio frequency antenna, wherein:
the dye layer is capable of emitting light in response to a voltage signal induced in the conductive path;
the photosensitive device is capable of receiving the emitted light and converting it to an electrical signal that depends on the intensity of the emitted light; and
the RF antenna is electrically connected to the photosensitive device, so as to be responsive to the electrical signal, produced in the photosensitive device in response to the light emitted from the dye layer, to transfer the electrical signal into an RF signal.

14. An RF tag according to claim 13 that includes a plurality of conductive paths, each of which is at least partially coated with a dye layer, thus resulting in a plurality of dye layers, so that a voltage signal induced in any one of the conductive paths causes the dye layer coating this path to emit light; wherein the light emissions emitted from the plurality of dye layers are transferred by the photo sensitive device into a plurality of electrical signals transmitted by the antenna as a plurality of RF signals.

15. An RF tag according to claim 14 arranged to transmit the plurality of RF signals sequentially.

16. An RF tag according to claim 15 wherein the conductive paths are connected in series by additional paths of low electrical conductivity, to cause the voltage signal induced in one conductive path in the sequence to reach the next conductive path in the sequence after a time delay, said time delay being long enough so that the photo sensitive device will treat the emission from each of the dye layers as an independent signal.

17. An RF tag according to claim 14 wherein said conductive paths are coated with a mediating layer.

18. An article carrying a tag according to claim 14.

19. An RF tag according to claim 13 wherein said conductive path is coated with a mediating layer.

20. An RF tag according to claim 19, wherein said mediating layer is a polymeric layer.

21. An RF tag according to claim 20 wherein said polymeric layer comprises a phospholipid.

22. An RF tag according to claim 13, wherein said photosensitive device is a photodiode.

23. An RF tag according to claim 13, wherein said conductive path is printed on said substrate.

24. An article carrying a tag according to claim 13.

25. A method for producing an RF tag according to claim 13, the method comprising:
(i) providing a substrate;
(ii) printing on the substrate at least one conductive path;
(iii) printing at least partially on each of said at least one conductive path a dye layer comprising at least one compound selected from voltage sensitive fluorescent dye (VSFD) compound, electro luminescent (EL) compound, and organic light emitting diode (OLED) compound, thus forming at least one printed conductive path at least partially coated;
(iv) applying to said at least one printed conductive path formed in step (iii) a photosensitive device that is capable of sensing light emitted from a dye layer coating said conductive path; and
(v) printing an antenna electrically connected to the photosensitive device and to one of the conductive paths.

26. A method according to claim 25, wherein said dye layer comprises a mixture of more than one compound, each being independently selected from voltage sensitive fluorescent dye (VSFD) compound, electro luminescent (EL) compound, and OLED compound.

27. A method according to claim 13, wherein said dye layer comprises a mixture of more than one compound, each being independently selected from voltage sensitive fluorescent dye (VSFD) compound, electro luminescent (EL) compound, and OLED compound.

* * * * *

UNITED STATES PATENT AND TRADEMARK OFFICE
CERTIFICATE OF CORRECTION

PATENT NO. : 6,819,244 B2
DATED : November 16, 2004
INVENTOR(S) : Dukler et al.

It is certified that error appears in the above-identified patent and that said Letters Patent is hereby corrected as shown below:

<u>Column 6,</u>
Line 65, change "3" to -- 2 --.

Signed and Sealed this

Sixth Day of September, 2005

JON W. DUDAS
*Director of the United States Patent and Trademark Office*